United States Patent Office 3,274,154
Patented Sept. 20, 1966

3,274,154
POLYMERIZATION OF CYCLIC
SILOXANES
Thomas Charles Kendrick and David Randall Thomas,
Dinas Powis, Glamorgan, Wales, assignors to Midland
Silicones Limited, London, England
No Drawing. Filed July 17, 1963, Ser. No. 295,837
Claims priority, application Great Britain, Aug. 2, 1962,
29,722/62
8 Claims. (Cl. 260—46.5)

This invention relates to a method of polymerizing cyclic organosiloxanes to produce siloxane polymers of higher molecular weight.

Cyclic siloxanes are a desirable starting point for the manufacture of organosiloxane polymers of moderate and high molecular weight. The preparation of high viscosity fluids and gum-like polymers which are essentially linear in nature is particularly important because such materials find wide application in industry. The high polymers are widely used in silicone rubber and as silicone fluids. The cyclic siloxanes are particularly suitable as starting materials because they can be isolated in relatively pure state substantially free from monofunctional and trifunctional siloxane units which are often present when siloxane polymers are prepared by hydrolysis of silanes such as dimethyldichlorosilane.

Several methods have been proposed for polymerizing cyclic siloxanes to produce higher molecular weight siloxane polymers. One such method involves preparation of organosilicon polymers from cyclic siloxanes consisting primarily of units of the formula $R_2SiO$ by treating the cyclic siloxane with an aqueous acid such as aqueous HCl and heat or with an oxidative agent and heat. Ferric chloride can be included in the reaction mixture. The method proposed required the use of temperatures in the range of 200° to 300° C. and at such temperatures cleavage of some of the R groups from the silicon was inevitable. Accordingly, the proposed method produced some monofunctional and some trifunctional units in the ultimate polymer.

Other methods which have been employed for polymerizing cyclic siloxanes include the use of ferric chloride alone at temperatures above 100° C. and also the use of aqueous hydrochloric acid, concentrated sulfuric acid or other strong acids usually mineral acids at temperatures of about 25° C.

It is the object of this invention to introduce a novel system for polymerizing cyclic siloxanes at relatively low temperatures to produce high polymeric essentially linear diorganosiloxane polymers. Another object is to introduce a novel catalyst system for effecting the polymerization of cyclic diorganosiloxanes. A further object is a method of polymerizing cyclic siloxanes at temperatures below 100° C. to produce high polymers in good yield with a relatively simple inexpensive catalyst system. Another object is a method of producing high polymeric essentially linear diorganosiloxane polymers easily freed from polymerization catalyst and particularly suited for incorporation in slicone rubber stocks. Other objects and advantages of this invention are detailed in or will be apparent from the disclosure and claims following.

This invention relates to a process for the preparation of linear siloxane polymers consisting essentially of contacting a cyclic organosiloxane with (1) an anhydrous acid and (2) an anhydrous halide of an element from Groups III, IV, V and VIII of the Periodic Table of Elements at a temperature of from 10° to 100° C.

The cyclic siloxanes employed as starting materials in this invention are defined by the general formula $$(RR'SiO)_n$$

where $n$ is an integer having a value of at least 3 and is preferably 3 or 4. The substituents bonded directly to silicon represented by R and R' can be the same or different and can be hydrogen atoms, monovalent hydrocarbon radicals, or monovalent substituted hydrocarbon radicals. Specific examples of the monovalent radicals represented by R and R' include alkyl radicals such as methyl, ethyl, propyl, butyl, nonyl, and octadecyl radicals; alkenyl radicals such as vinyl, methallyl and octadecenyl radicals, aryl radicals such as phenyl and naphthyl; alkaryl radicals such as tolyl and ethylphenyl; aralkyl radicals such as phenylethyl, benzyl and phenylpropyl; cycloaliphatic radicals such as cyclopropyl, cyclohexyl, cyclohexenyl and cyclooctyl; and substituted hydrocarbon radicals such as aminopropyl radicals, 3,3,3-trifluoropropyl, chloromethyl, perfluorovinyl and other halogenated derivatives of the hydrocarbon radicals listed above. Particularly important cyclic siloxanes because of commercial availability and demand for higher polymers containing such units are cyclic dimethylsiloxanes, cyclic methylphenylsiloxanes, cyclic methylvinyl siloxanes, cyclic 3,3,3-trifluoropropylmethylsiloxanes and similar cyclic siloxanes where R and R' are methyl, ethyl, phenyl, vinyl, 3,3,3-trifluoropropyl and cyanoalkyl radicals.

The cyclic siloxanes are preferably trimers or tetramers (e.g. $n=3$ or 4) but pentamers and higher cyclic siloxanes can be employed in this method. Mixtures of cyclic siloxanes where $n$ has various values as well as where R and R' vary can be employed. Of course, a single cyclic siloxane specie such as dimethylsiloxane cyclic trimer can be employed. The cyclic siloxane is contacted with an anhydrous acid and a halide of a compound from periods III, IV, V and VI of Groups III, IV, V and VIII (i.e. excluding boron, carbon and nitrogen) of the Periodic Chart of Elements (See Handbook of Chemistry and Physics, 40th Edition, Chemical Rubber Publishing Co., Cleveland, Ohio, pages 444–447). The halides employed herein can be described as Lewis acid type metal halides, the most suitable being the halides of tin, iron, titanium and aluminum. Substituted covalent halides such as phenyldichlorophosphine can also be used. The operable halides are fluorides, chlorides, bromides and iodides of Al, Si, P, Sc, Ti, V, Ga, Ge, As, Y, Zr, Nb, In, Sn, Sb, Tl, Hf, Ta, Pb, Bi, Fe, Co, Ni, Ru, Rh, Pd, Os, Ir and Pt.

The acid component of the catalyst system is an essentially anhydrous organic or inorganic acid having a dissociation constant in aqueous solution of at least $10^{-5}$. Particularly useful acids include hydrochloric acid, pyrophosphoric acid, trichloroacetic acid, toluene sulfonic acid, benzene sulfonic acid, benzoic acid and acetic acid. In general, the rate of polymerization can be increased by employing an acid having a higher dissociation constant in aqueous solution.

The cyclic siloxane, halide and anhydrous acid are admixed in any desired order employing any desired method. The polymerization of the cyclic siloxane is indicated by an increase in the viscosity of the reaction mass. In some cases it may be desirable to employ an organic solvent such as toluene, benzene or other petroleum derived organic solvent inert to the reactants, for the reaction mass because the product may reach a gum-like state which is difficult to handle except in solution in organic solvent. The polymerization can be carried to any desired level and the polymer can be recovered from the solvent merely by removing the solvent from the reaction mass. The anhydrous acid can be employed as a gas if desired, thus hydrochloric acid can be bubbled through the siloxane and halide mixture. If desired, the linear polymer produced by this invention can be endblocked with triorganosilyl units by including in the reaction mass a hexaorganodisiloxane or an octaorganotrisiloxane or similar material in the reaction mixture during the reaction.

The polymerization rate proceeds at a satisfactory rate at room temperature in the presence of 0.1 percent by weight of each component of the catalyst based on the weight of cyclic siloxane present. The reaction occurs at lower temperatures but at a decreased rate. It is apparent increased temperatures produce increased rate of reaction and larger portions of catalyst will bring about an increased rate of reaction. Generally, satisfactory reaction rates are achieved in the range 20° C. to 100° C. The reaction can be carried out at any desired pressure including subatmospheric, atmospheric and superatmospheric pressures. If a closed system is used, autogenous pressures are satisfactory.

When the cyclic iloxanes employed contain organic substituents which are particularly sensitive to cleavage, it may be desirable to employ relatively mild anhydrous acids. Thus, although trichloroacetic and benzoic acids are very suitable for use with dimethylsiloxanes it may be preferable to use a milder acid such as acetic acid with phenylmethylsiloxanes and methylvinylsiloxanes.

The catalyst systems introduced by this invention have many advantages when compared to the systems heretofore employed. For example, by employing the mixture of halide and anhydrous acid as described in this invention, the cyclic siloxane is polymerized at relatively low temperatures without cleavage of orbanic substituents from the silicon atoms. Furthermore, the previously known low temperature acid polymerization catalysts were restricted to strong aqueous mineral acids. The present invention permits the use of a wide range of anhydrous acids of varied strength to permit choice of acid catalyst to give maximum reaction rate and minimum cleavage of organic groups during the polymerization process.

The products of this invention are essentially linear diorganosiloxane polymers and copolymers useful in any of the broad range of applications known for silicone rubbers and fluids.

The following examples illustrate the invention and do not restrict the scope of the invention which is delineated in the appended claims. All viscosities were measured at 25° C.

*Example 1*

Ahydrous HCl gas was bubbled through a mixture of 20 g. of octamethyl cyclo tetrasiloxane, $[(CH_3)_2SiO]_4$, and 0.1 g. anhydrous ferric chloride for 5 mins. at 25° C. and the mixture allowed to stand at this temperature in a sealed glass container for 24 hours.

The resulting polymer was a stiff gum which dissolved in toluene and conventional solvents for siloxanes to give viscous solutions.

*Example 2*

A mixture of 20 g. octamethyl cyclotetrasiloxane, 0.1 g. ferric chloride and 0.1 g. anhydrous trichloracetic acid in 1 g. anhydrous toluene was held at 25° C. in a sealed glass container for 4 days.

The resulting polymer was a gum soluble in the conventional solvents, such as toluene and xylene.

*Example 3*

The procedure of Example 2 was repeated with the trichloracetic acid replaced in turn with the anhydrous acids listed in Table 1, each mixture being held at 25° C. in a sealed container for the periods indicated. The nature of the polymer obtained in each case is shown in the table.

TABLE 1

| Anhydrous Acid | Time at 25° C., days | Polymer Obtained |
|---|---|---|
| Benzoic acid | 4 | Stiff gum. |
| Acetic acid | 4 | Clear fluid of viscosity 500 cs. |
| Pyrophosphoric acid | 7 | Gum. |
| Toluene sulphonic acid | 7 | Gum. |

*Example 4*

Methyl-γ-chloropropylsiloxane of viscosity 5 cs. and containing a proportion of cyclic material was obtained by hydrolyzing methyl-γ-chloropropyl dichlorosilane in the normal fashion. A mixture of 20 g. of this hydrolyzate, 0.1 g. ferric chloride and 0.1 g. anhydrous trichloracetic acid in 1 g. toluene was held at 25° C. for 48 hours. After this time the viscosity had risen to 2,000 cs.

*Example 5*

A mixture of 0.1 g. anhydrous acetic acid and 0.1 g. ferric chloride was employed to polymerise mixed methylphenyl cyclic siloxanes comprising mainly the trimer, and also to polymerise mixed methylvinyl cyclic siloxanes. After the mixtures had been held at 25° C. for 24 hours about 0.5 g. of siloxane polymer was in each case precipitated from 2.0 g. of the mixture by means of a large excess of methanol.

*Example 6*

A mixture comprising 20 g. of methylhydrogen cyclotetrasiloxane, 0.1 g. ferric chloride and 0.1 g. anhydrous trichloroacetic acid in 1 g. anhydrous toluene was held at 25° C. for 24 hours in a nitrogen atmosphere. A siloxane gum was obtained which was soluble in toluene.

*Example 7*

Anhydrous hydrochloric acid gas was bubbled for 5 minutes through a mixture of 20 g. of octamethyl cyclotetrasiloxane, and 0.1 g. of a metal halide. The process was carried out using the halides listed in Table 2, the mixtures then being stored in sealed glass containers for various periods of time. Polymers were obtained in each case having the viscosities indicated in the table.

TABLE 2

| Halide | Time at 25° C., days | Polymer viscosity (cs.) |
|---|---|---|
| $AlCl_3$ | 7 | 200 |
| Phenyldichlorophosphine | 4 | 100 |
| $SnCl_4$ | 14 | 500 |
| $TiCl_4$ | 14 | 100 |

*Example 8*

The procedure of Example 2 was repeated with the ferric chloride replaced in turn with the anhydrous halides listed in Table 3.

Siloxane polymers were obtained having the indicated viscosities after the mixtures had been allowed to stand for various periods at 25° C.

TABLE 3

| Halide | Time at 25° C., days | Polymer viscosity (cs.) |
|---|---|---|
| $SnCl_4$ | 14 | 100 |
| $TiCl_4$ | 14 | 250 |
| $PCl_3$ | 14 | 500 |

In each of the above examples control experiments were carried out employing the cyclic siloxane and the acid alone in contact for 28 days. At the end of this period no significant increase in the viscosity of the mixture was noted.

Example 9

Equivalent results were achieved when Example 1 was repeated employing 20 g. of any of the following cyclic siloxanes in place of the octamethylcyclotetrasiloxane: $[(CH_3)_2SiO]_3$; $[(CH_3)_2SiO]_5$; an equimolar mixture of $[(CH_3)_2SiO]_3$ and $[(CH_3)_2SiO]_4$; $[(CH_3)(C_2H_5)SiO]_4$; and $[(CH_3)(C_9H_{19})SiO]_4$.

Example 10

Equivalent results were achieved when Example 5 was repeated employing 20 g. of each of the following cyclic siloxanes: $[(CF_3CH_2CH_2)CH_3SiO]_3$; an equimolar mixture of $[(CH_3)_2SiO]_4$ and $[(CH_3)(CH_2\!\!=\!\!CH)SiO]_3$; an equimolar mixture of $[(CH_3)(C_6H_5)SiO]_4$ and $$[(CH_3)HSiO]_4$$

a mixture of cyclic methyl siloxanes of the formula $[(CH_3)_2SiO]_n$ where $n$ is 3, 4 and 5; and an equimolar mixture of $[(CF_3CH_2CH_2)CH_3SiO]_3$ and $[(CH_3)_2SiO]_4$.

Example 11

Equivalent results were achieved when Example 1 was repeated employing an equivalent amount of each of the halides listed below in place of the ferric chloride: $SiCl_4$, $ZrCl_3$, bismuth chloride, antimony chloride, cobalt chloride, nickel chloride, platinum chloride and equivalent fluorides and bromides.

That which is claimed is:

1. A method of polymerizing cyclic diorganosiloxanes of the general formula $(RR'SiO)_n$ where each R and each R' are individually selected from the group consisting of hydrogen atoms, monovalent hydrocarbon radicals, monovalent halogenated hydrocarbon radicals and aminoalkyl radicals and $n$ is an integer having a value of at least 3, consisting essentially of contacting the cyclic diorganosiloxanes with (1) an anhydrous acid having a dissociation constant in aqueous solution of at least $10^{-5}$ and (2) a halide selected from the group consisting of halides of Al, Si, P, Sc, Ti, V, Ga, Ge, As, Y, Zr, Nb, In, Sn, Sb, Tl, Hf, Ta, Pb, Bi, Fe, Co, Ni, Ru, Rh, Pd, Os, Ir and Pt, and substituted covalent halide phenyldichlorophosphine, at a temperature up to 100° C.

2. The method of claim 1 wherein 100 parts by weight of the cyclic diorganosiloxane is admixed with 0.1 part of (1) anhydrous acid and 0.1 part (2) halide.

3. The method of claim 1 wherein (1) is an anhydrous acid selected from the group consisting of a hydrogen halide, acetic acid, a halogenoacetic acid, a benzoic acid, pyrophosphoric acid and toluene sulphonic acid.

4. The method of claim 1 wherein the halide (2) is ferric chloride.

5. The method of claim 1 wherein the halide (2) is aluminum chloride.

6. The method of claim 1 wherein the halide (2) is phenyldichlorophosphine.

7. The method of claim 1 wherein the halide (2) is tin chloride.

8. The method of claim 1 wherein the halide (2) is titanium chloride.

References Cited by the Examiner

UNITED STATES PATENTS

| | | | |
|---|---|---|---|
| 2,371,050 | 2/1945 | Hyde | 260—448.2 |
| 2,421,653 | 6/1947 | Sauer | 260—448.2 |
| 2,759,008 | 8/1956 | Dunham et al. | 260—448.2 |

OTHER REFERENCES

Eaborn, Organosilicon Compounds, New York, Academic Press, pages 259–260, 1960.

Kleinberg et al., Inorganic Chemistry, D. C. Heath Co., Boston, 1960, pages 192–197.

LEON J. BERCOVITZ, *Primary Examiner.*

SAMUEL H. BLECH, *Examiner.*

M. I. MARQUIS, *Assistant Examiner.*